United States Patent [19]

Kühbauch

[11] Patent Number: 4,958,405
[45] Date of Patent: Sep. 25, 1990

[54] WIPER DEVICE FOR A CURVED WINDSHIELD OF A VEHICLE

[75] Inventor: Gerd Kühbauch, Bühlertal, Fed. Rep. of Germany

[73] Assignee: Robert Bosch GmbH, Stuttgart, Fed. Rep. of Germany

[21] Appl. No.: 353,073

[22] Filed: May 15, 1989

[30] Foreign Application Priority Data

Jul. 20, 1988 [DE] Fed. Rep. of Germany ....... 3824489

[51] Int. Cl.$^5$ ................................................ B60S 1/44
[52] U.S. Cl. ............................. 15/250.33; 15/250.21; 15/250.23; 15/250.30
[58] Field of Search ........... 15/250.20, 250.21, 250.22, 15/250.23, 250.29, 250.30, 250.31, 250.32, 250.33, 250.34, 250.35, 250.36

[56] References Cited

U.S. PATENT DOCUMENTS

| | | | |
|---|---|---|---|
| 2,505,078 | 4/1950 | Allen. | |
| 2,644,187 | 7/1953 | Lacy | 15/250.23 |
| 3,178,751 | 4/1965 | Wubbe | 15/250.35 |
| 3,405,421 | 10/1968 | Tomlin | 15/250.33 |
| 3,427,675 | 2/1969 | Tibbet | 15/250.35 |
| 4,858,268 | 8/1989 | Shirato | 15/250.21 |

FOREIGN PATENT DOCUMENTS

| | | | |
|---|---|---|---|
| 215814 | 6/1958 | Australia | 15/250.34 |
| 2135031 | 1/1973 | Fed. Rep. of Germany | 15/250.36 |
| 3638159 | 5/1988 | Fed. Rep. of Germany. | |
| 116341 | 5/1987 | Japan | 15/250.32 |
| 566714 | 1/1945 | United Kingdom | 15/250.35 |

Primary Examiner—Philip R. Coe
Assistant Examiner—Mark Spisich
Attorney, Agent, or Firm—Michael J. Striker

[57] ABSTRACT

A wiper device for a windshield of a vehicle comprising a wiper arm, a drive for oscillating the wiper arm, and an elongate flexible torsion rigid member for transmitting an oscillating movement of the wiper arm into pivotal movement of the wiping blade about an axis spaced from the windshield and extending substantially parallel thereto, the elongate flexible torsion rigid member including a fixed end having a longitudinal axis extending to the pivot axis of a pivot shaft attached to the other end of the elongate flexible member and connected to the wiping blade, at an angle less than 180°, and extending to the axis of a wiper shaft at an angle less than 90°, the pivot axis of the pivot shaft being a continuation of the longitudinal axis of the other end of the elongate flexible member.

5 Claims, 1 Drawing Sheet

WIPER DEVICE FOR A CURVED WINDSHIELD OF A VEHICLE

BACKGROUND OF THE INVENTION

The invention relates to a wiper device for a vehicle windshield. Prior art (U.S. Pat. No. 2,505,078) discloses a device with reciprocating wipers in which a median plane that passes through a wiper blade extends perpendicular to the windshield when the wiper blade placed on the windshield is not loaded. Such a blade is able to optimally clean a planar windshield. The relationship between the wiping blade and the windshield does not change over the windshield area covered during reciprocal movement of the blade, and no deviation of the wiping blade from the normal line occurs. When the windshield has a curved surface, the angle of inclination of this median plane, to the outer surface of the windshield constantly changes over the area covered by the reciprocating blade. This change is also noticable in the longitudinal direction of the wiping blade which, upon its reciprocal movement describes a ring segmental area. The position of the plane relative to the windshield area traversed thereby, at the outer sides of the arc of the described area, changes as at the inner arc so that at the middle arc described by the link between the wiping blade and a wiper arm. The optical orientation of the plane relative to the windshield achieved when the windshield has a planar surface, can only be achieved pointwise when the windshield has a curved surface, and it constantly changes in the longitudinal direction of the wiping blade. The actual deviations from an ideal orientation will be greater in more curved areas of the windshield than in the base - middle areas thereof. Flexibility of a contact element of the wiping blade can compensate these deviations only to a certain extent.

Therefore, in known wiper devices the oscillation axis is so oriented relative to the windshield contour that, in the middle position of the wiping blade, the oscillation axis would extend ideally to the windshield area passing therethrough in the next following position of the median plane. The more curved is the windshield in the covered area, the more the position of the median plane deviates from the ideal position. This deviation error is called normal deviation and is expressed as an angle. As discussed above, the normal deviation is always large at inner, middle and outer circles. From the above, it follows that the angle defining the normal deviation is formed by a line lying in the described plane and a line which is perpendicular to a windshield surface which passes through the line lying in the described area. Another drawback consists in that the foregoing deviation from an ideal condition changes with movement of the wiping blade in opposite directions. It is especially difficult to control the conditions which occur in so-called one-arm windshield-wiper systems where the wiping blade has to cover the both strongly curved areas of the windshield.

DE-OS 3,638,159 discloses a device in which there is provided means for transforming an oscillating movement of a wiper arm into pivotal movement of the wiping blade. However, this transforming means is rather complicated and should be made with a very high precision.

SUMMARY OF THE INVENTION

The object of the invention is to provide a simple low-cost wiper device for cleaning vehicle windshield having a curved surface.

The object of the invention is achieved by providing means for transforming an oscillating movement of the wiper arm into a pivotal movement of the wiping blade and which comprises an elongate flexible torsion rigid member with one end thereof being fixed and having its another end supported by the wiper arm and connected to the wiping blade and with longitudinal axes of both ends forming an angle of less than 180°.

The present invention as to its construction so to its mode of operation, together with additional objects and advantages thereof, will be best understood from the following description of the preferred embodiment with reference to the appended drawings.

DESCRIPTION OF THE PREFERRED EMBODIMENTS

Figure 1:
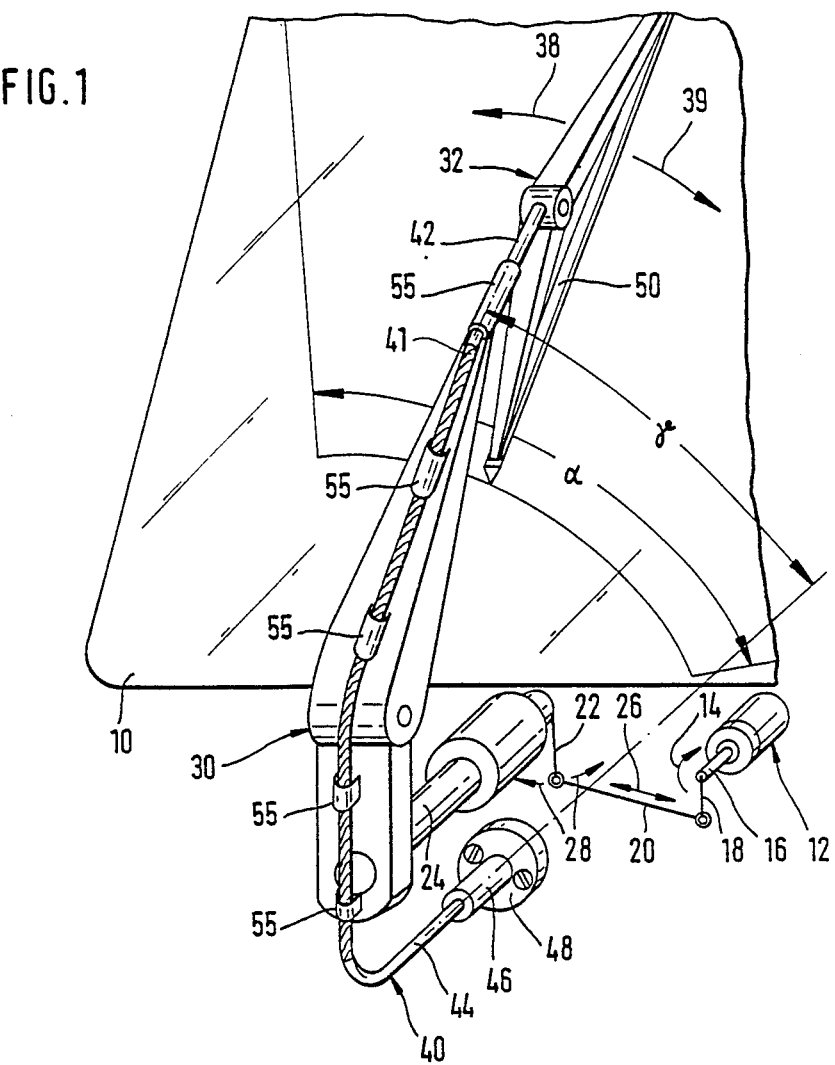
FIG. 1 shows a perspective view of a wiper device according to the present invention.

FIG. 1 shows a wiper device for a windshield 10 of a vehicle (not shown). The wiper device comprises a drive unit 12 having a drive shaft 16 rotatable in a clockwise direction as indicated by an arrow 14. A crank 18 is fixedly connected to the drive shaft 16 for joint rotational movement therewith. A drag link 20 is connected at one of its end with the free end of the crank 18. The other end of the drag link 20 is connected to a swiveling lever 22 which is fixed to a wiper shaft 24. A wiper arm 30 carrying a wiping blade 32 supported on the windshield of the vehicle, is attached to the end of the wiper shaft 24 remote from the swiveling lever 22. To transmit the reciprocal movement of the wiper arm 30 into pivotal movement of the wiping blade 32, the wiper device is provided with an elongate, single-ended, fixed flexible member 40. The member 40 is connected at its one end 41 to the wiping blade 32 directly or through, i.e., intermediate shaft. Also, a pivot shaft 42 may be provided at the end 41 and connected with the wiper blade 32. The pivot shaft may be formed integral with the flexible member. The other fixed end 44 of the member 40 is anchored in a tube 46 having a disc flange 48 at an end thereof. The flange 48 is fixedly attached to the vehicle body (not shown). The flexible member 40 formed as a torsion rigid rod, extends through guides 55 on the wiper arm 30. As shown in FIG. 1, the longitudinal axis of the fixed end 44 of the member 40, forms with the longitudinal axis of the end 41 thereof or the axis of the pivot shaft 42 an angle which is less than 180°, and forms with the axis of the wiper shaft 24 an angle less than 90°. The pivot axis of the pivot shaft forms a continuation of the longitudinal axis of the end 41.

Upon clockwise rotation of the crank 18 as indicated by the arrow 14, the drag link moves in opposite directions as shown by arrows 26 and transmits the rotational movement of the crank 18 to the swiveling lever 22 which pivots in opposite directions as shown by arrows 28. The pivotal movement of the swiveling lever 22 is transmitted to the wiper shaft 24 which oscillates accordingly, the wiper arm 30 and the wiper blade 32.

The oscillating movement of the wiper blade 32 is shown by arrow 38 and 39. When the wiper arm 30 describes about the longitudinal axis of the wiper shaft 24 an angle α, the end 41 of the flexible member 40 and the wiper blade 32 move relative to the fixed end 44 of the flexible element which relative movement is indicated by a angle β in FIG. 2. This relative movement takes place when the wiper arm 30 together with the wiping blade 32 describes an angle α on the windshield. The displacement β is so correlated with the displacement α that, upon oscillation in the direction indicated by arrows 38, the wiping blade 32 pivots in opposite direction so that the wiping blade contact element 50 moves to a position indicated in FIG. 2 with reference numeral 50'. The wiping blade contact element 50 moves to a position indicated in FIG. 2 with reference numeral 50'' when the wiper arm moves in the direction indicated by arrow 39.

The wiper blade 32 thus pivots about an axis which is spaced from the windshield 10 and extends parallel thereto. This axis in the described embodiment is aligned with the axis of the wiper shaft 24 though this is not a strict requirement.

Figure 2:
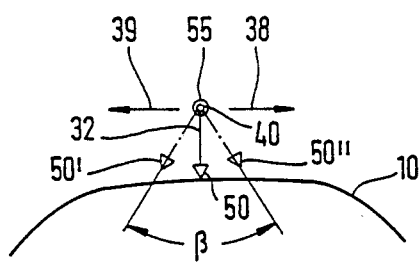
FIG. 2 shows schematically a top view of a wiping blade of the wiper device according to the invention in different positions thereof on the windshield.

The wiper blade 32 pivots about the longitudinal axis of the pivot shaft 42 as it can be seen in FIG. 2. As it has already been discussed earlier, pivotal movement to the wiper blade 32 is imparted by the flexible torsion rod 40. As it has also been discussed earlier, the flexible torsion rod is fixed at the end 44 thereof which is opposite to the end at which the torsion rod 40 is connected with the wiper blade, with the axis of the end 44 forming an angle of less than 90° with the axis of the wiper shaft. Due to this inclination of the axis of the fixed end 44 to the axis of the wiper shaft 24, the wiper arm 30, upon its oscillation by the wiper shaft 24, causes rotation of the flexible torsion rod 40 about its own axis in the guides 55. This rotation is transmitted into the pivotal movement of the wiper blade 32 to which the flexible torsion rod is secured at its end 41 (via the shaft 42).

During oscillating or reciprocal movement of the wiper arm 30, some longitudinal displacement of the flexible torsion member 40 in the guides 55 and, accordingly, of the intermediate shaft is possible. However, this displacement does not adversely affect operation of the device.

Thus, there is provided a wiper device having a wiper blade which continuously adapts to the curvature of the windshield. Another advantage of the wiper device according to the invention consists in that a noiseless reliable and trouble-free operation of the wiper device is assured due to the simplicity of the wiper device construction. The wiper device according to the present invention will be especially useful where, when a wiper device is used for a rear window and for cleaning headlamps, it is required that the wiping blade besides an oscillating movement performs a pivotal movement as described above. Also, pivotal movement of the wiping blade promotes tipping motion of the wiper blade contact element which tipping motion results in respective reciprocating positions of the wiping blade so that the wiping blade contact element is dragged over the windshield 10.

While the invention has been illustrated and described as embodied in a wiper device for a windshield of a vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A wiper device for a windshield of a vehicle, said wiper device comprising an oscillating wiper arm having a free end; a wiping blade connected with said wiper arm at said free end of said wiper arm and pivotable about a pivot axis as a result of an oscillating movement of said wiper arm, said pivot axis being spaced from the windshield and extending substantially parallel thereto; and an elongate flexible member fixed at one end thereof and having at the other end thereof a pivot shaft defining said pivot axis and displaceable with said wiper arm and connected with said wiping blade for transforming the oscillating movement (α) of said wiper arm into a pivotal movement of said wiper blade, said one end and said pivot axis defining first and second longitudinal axes, respectively, said pivot axis forming an angle (γ) with said first axis less than 180°.

2. A wiper device according to claim 1, further comprising a wiper shaft defining an oscillating axis for said wiper arm, said first axis of said one end of said flexible element forming with said oscillating axis an angle less than 90°.

3. A wiper device according to claim 1, wherein said pivot shaft is integral with said flexible member.

4. A wiper device according to claim 1, wherein said flexible member is formed as a torsion rigid member.

5. A wiper device according to claim 1, wherein said wiper arm includes at least one guide member for said flexible member.

* * * * *